July 23, 1968  E. L. KUMMER ET AL  3,393,676
DENTAL INSTRUMENT ASSEMBLY
Filed Sept. 28, 1964  4 Sheets-Sheet 1

INVENTORS
EDSON L. KUMMER AND
BY  KARL H. BURZLAFF

ATTORNEYS

July 23, 1968  E. L. KUMMER ET AL  3,393,676

DENTAL INSTRUMENT ASSEMBLY

Filed Sept. 28, 1964  4 Sheets-Sheet 2

INVENTORS
EDSON L. KUMMER AND
KARL H. BURZLAFF
BY
Thurman + Schnee
ATTORNEYS

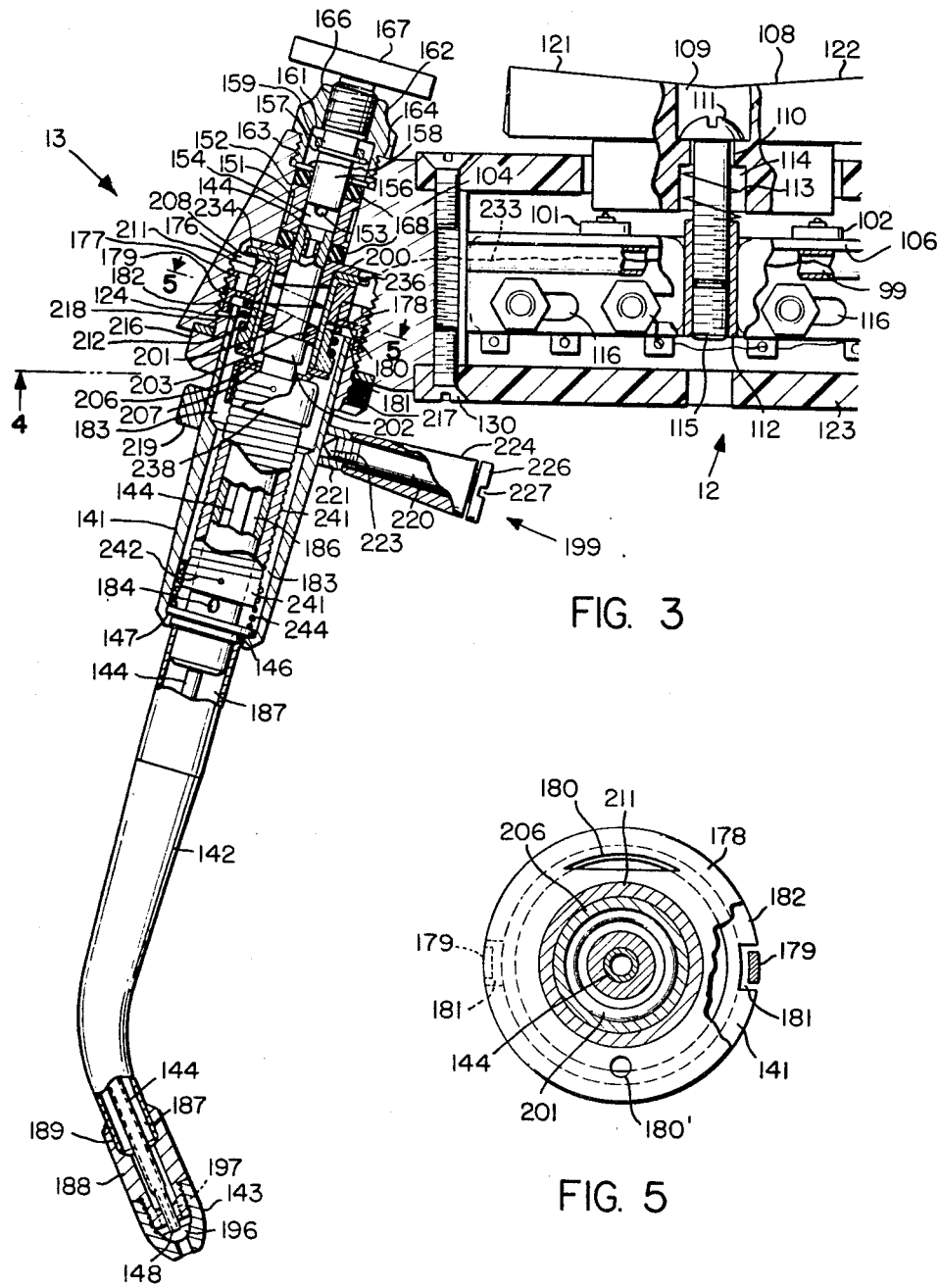

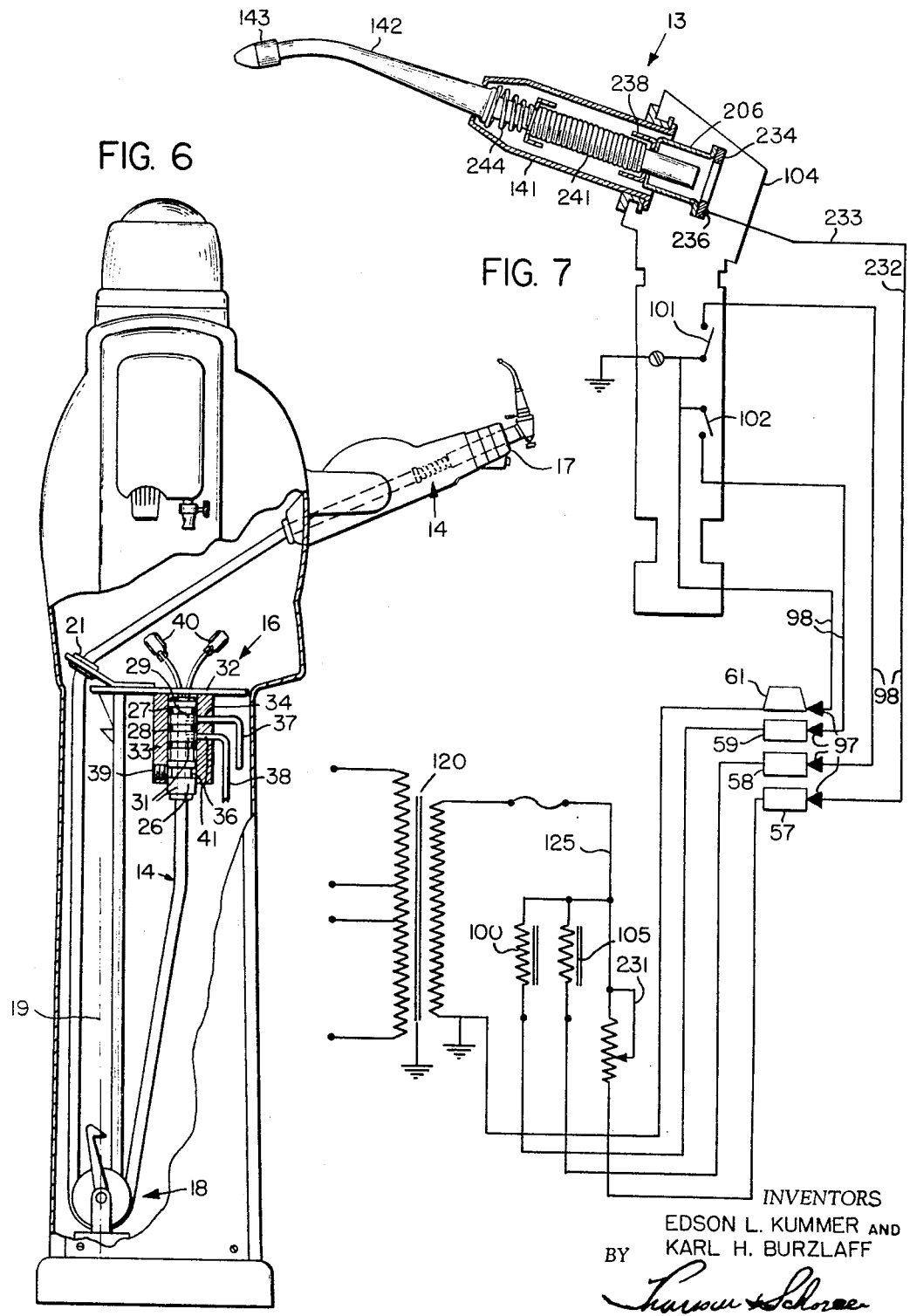

United States Patent Office 3,393,676
Patented July 23, 1968

3,393,676
DENTAL INSTRUMENT ASSEMBLY
Edson L. Kummer, Rochester, and Karl H. Burzlaff, Fairport, N.Y., assignors to Ritter Pfaudler Corporation, a corporation of New York
Filed Sept. 28, 1964, Ser. No. 399,482
5 Claims. (Cl. 128—173.1)

This invention relates to dental equipment and more particularly to a dental instrument and dental syringe and appurtenances thereto such as are used by a dentist in the practice of his profession and which are normally carried by and mounted in a so-called dental unit.

An equipment stand or dental unit employed in the practice of dentistry may take any suitable form, usually comprising a pedestal in which are mounted various utilities and instruments used by the dentist in the practice of his profession. Such dental units are mounted adjacent a dental chair and various instruments, such as a mouth lamp, a cautery or tooth pulp tester and various syringes are carried by the equipment stand within easy reach of the dentist. More recently, high speed dental drills and a dental drill for producing high torque at low speeds have been developed. These instruments also are mounted on or adjacent to the panel of a dental unit.

Each of the above instruments, in their preferred forms are connected to a utility such as cold water, hot water, air or electricity carried within the unit and the instruments are normally supported in sockets mounted on the dental unit. In most cases, the instrument is connected to the utility by a flexible hose which may be withdrawn from the unit when it is to be used on a patient undergoing treatment. Means are also provided for automatically retracting the flexible cord or hose within the unit and to carry or return the instrument to its holder automatically when released by the dentist after use thereof has been completed. This invention relates to one of such instruments, namely a syringe, and more specifically a syringe adapted to selectively supply warm water, air or a spray of warm water and air. However, certain features of this invention are applicable to any dental instrument adapted to be mounted on, and within a dental unit wherein a retractable, flexible cord is connected to the instrument and usually to a utility within the dental unit.

An object of the invention is to provide a more efficient and versatile syringe for use by a dentist in the practice of his profession.

Another object of the invention is to provide a combined air and water syringe wherein a single finger or thumb operated member controls all operations to enable the discharge, at the will of the dentist, of water, air, or a variable mixture of water and air.

Another object of the invention is to provide a dental spray instrument adapted to selectively enable a dentist to apply to the tooth of a patient, water, air or a mixture of water and air, the volume of both of which may be readily varied by finger operation while the instrument actuator is depressed by the dentist to its normal position for use and, if desired, without interrupting the stream of fluid which the dentist amy be applying to the tooth.

Still another object of our invention is to provide a means, in this form of the invention, comprising a cable having one end connected to the instrument and the other end connected rigidly within the dental unit which is combined with a flexible hose carrying the specific uitility or utilities such as air, water, or electricity which limits the outward withdrawal of the instrument to protect the utility conduit or conduits against being pulled out of the dental unit or otherwise damaged should the dentist pull on the hose too vigorously and in such a fashion as to put a strain on the hose, its connections within the unit and the utility conduit or conduits passing through the hose.

Still another object of our invention is to provide a dental instrument assembly wherein at least two swivel joints are provided: one between the hose and the instrument; and the other between the end of the hose and its connection within the dental unit to facilitate the use of the instrument by the dentist whether he be right or left-handed, to permit the dentist to properly align the instrument with the hose, and to permit easy attachment and detachment of the inboard end of the hose within the dental unit.

A further object of our invention is to provide a heater for a syringe connected to a hot-water supply within the unit wherein an auxiliary resistance heater is used in the dental instrument adjacent the idscharge end thereof which is always connected to the source of electricity whereby water is at the proper temperature for use.

Our invention further contemplates an air syringe, a water syringe or a combined air and water syringe connected to enable the dentist selectively to dispense air, water or a mixture of air and water, wherein the control for the syringe is located on the instrument in a position to be readily actuated by the dentist as he grasps the instrument and wherein the valves for turning the fluids on or off, although actuated at the instrument, are located within the dental unit whereby when the instrument is not in use, the instrument and its hose are substantially a atmospheric pressure thereby to reduce the possibility of leakage and to permit the hose to wind or rotate more readily on the retraction pulley located within the dental unit.

Other objects and advantages of this invention will be particularly set forth in the claims and will be apparent from the following description, when taken in connection with the accompanying drawings, in which:

FIG. 3 is a sectional view complementary to FIG. 2 showing a part of the handle, the fluid dispensing end of the syringe, the two views being read together;

FIG. 5 is a sectional view taken substantially on the line 5—5 of FIG. 3 in the direction indicated by the arrows;

FIG. 6 is a diagrammatic view showing the conducting flexible hose and the elements within a dental unit with which the dental assembly is associated; and FIG. 7 is a diagrammatic view showing the dental instrument and the wiring diagram therefor.

Figure 1:
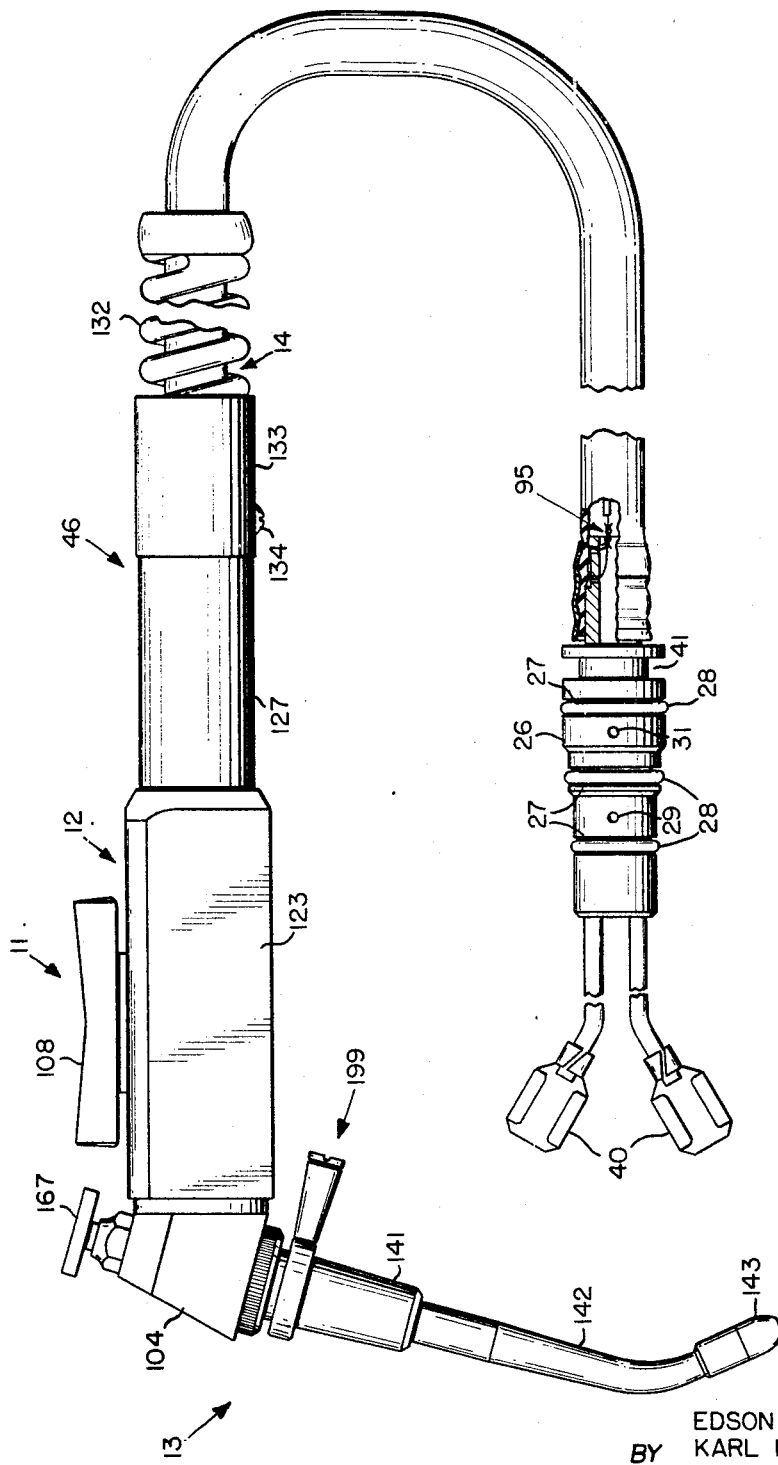
FIG. 1 is an external view of the dental instrument or dental syringe of our invention assembled with its hose and showing the male coupling on the end of the hose for reception in the female coupling carried in the dental unit, the view also showing the inboard end of the strain relief.
Figure 2:
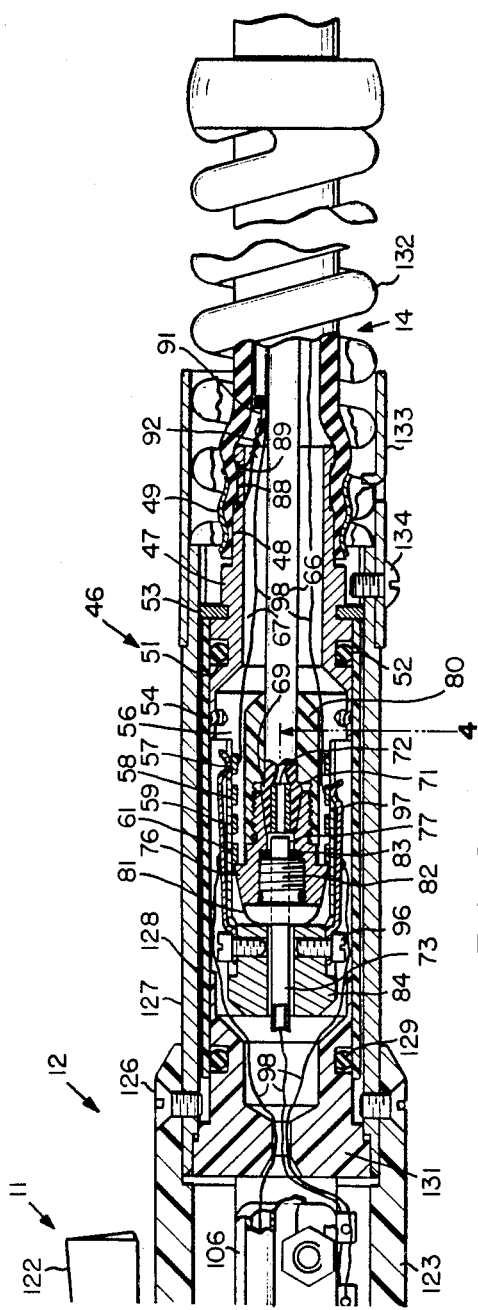
FIG. 2 is a sectional view of a part of the handle end of the dental instrument or syringe showing in particular the coupling between the instrument and the outboard end of the hose.

Referring to FIGS. 1, 2 and 3, the dental instrument assembly of my invention comprises a dental syrings, generally indicated by the numeral 11, which includes a handle part or syringe body, generally indicated by the numeral 12 and a fluid dispensing part generally indicated by the numeral 13. The instrument body 12 is connected to the outboard end of a flexible hose 14 (FIG. 6) while the inboard end of the hose is mounted in the dental unit the connection being diagrammatically and generally indicated by the numeral 16.

As is customary in this type of dental instrument assembly, after use of the hose 14 is retracted into the unit and the instrument into a socket 17 (FIG. 6) carried by the dental unit by retracting mechanism generally indicated by the numeral 18. As is customary with the type of equipment with which this invention is concerned, the retraction mechanism may be merely weighted for retracting the hose or a spring may be provided for winding the hose on a reel. In the particular arrangement shown, a gravity type of weighted mechanism is employed and the pulley moves along a vertical guide 19. The socket 17 may be carried by a panel (not shown) and may be of any conventional construction as shown for example, in United States Letters Patent No. Re. 24,087 issued in the name of F. E. Bronk.

A suitable guide, diagrammatically illustrated at 21, may be provided for the hose and a strain relief comprising a latch and a keeper may also be provided. Such strain reliefs may also comprise means for grasping the hose when in its extended position so as to relieve the dentist's arm of strain caused by the retraction mechanism when the dental instrument is in an extended position when in use.

In FIG. 1, I have shown at the lower part thereof, the inboard end of the flexible hose. Attached to this inboard end of the hose is a coupling member or male plug 26 which has a series of grooves 27 for the reception of three O-rings 28. The coupling member 26 has a radial water passage 29 lying between two O-rings and which connects with a longitudinal passage, also indicated by the numeral 29, which connects with a flexible water conductor or tube (not shown) extending through the hose. The coupling 26 is further provided with a radial air conduit 31 lying between two O-rings which connects with a longitudinal air conduit, also indicated by the numeral 31 which connects with the interior of the hose 14. The O-rings 28 serve to separate the radial water and air passages and to prevent leakage of water and air externally of the coupling.

Mounted in and rigidly connected to a wall of the dental unit, as indicated at 32, is a coupling member or female socket 33 (FIG. 6). The female socket has a radial water passage 34 and a radial air passage 36 to which water and air conduits 37 and 38 respectively are connected. The water and air conduits 37 and 38 are connected respectively to sources of water and air (not shown) within the unit. A set screw 39 extends through the female coupling 33 and grips the male coupling 26 so that the ports or passage for air and water respectively in the female coupling and the male coupling are in registry with each other longitudinally of the couplings.

Between the inner wall of the female coupling and the external wall of the male coupling are circumferential passages for air and water which are defined by the O-rings which separate the air and water. These circumferential passages connect with the ports previously described in the female and male couplings. The set screw 39 extends into a groove 41 in the male coupling and merely prevents the hose from being withdrawn while permitting the male coupling to rotate with respect to the female coupling and maintain the water and air connections.

A swivel joint is thus formed which permits proper alignment of the dental instrument with respect to the hose connection, but is primarily for the purpose of enabling the hose to adjust itself following assembly in the unit. The hose as received by the manufacturer of the dental unit is rolled or coiled so that it is to some extent prestrained. The swivel joint allows the hose to uncoil and seek its own orientation.

It has been thought not necessary to show a sectional view of the hose and the utility conduits extending therethrough. Plugs 40 are shown in FIG. 6 which connect with electrical outlets located in the unit and the wire connections extend through the hose. It is sufficient to state that the water flows through a flexible water conduit, the air flows through the hose extending around the flexible water conduit and the hose encloses the four current-carrying wires, the purpose of which will later appear.

Referring now to FIG. 2, the outboard end 46 includes a metal ferrule 47 having a portion at the end of decreased diameter connected to and over which the end of the hose 14 is fitted. The hose is made of rubber and the connection is made by pushing the end of the hose over the smaller diameter end of the ferrule, as illustrated at 48. A corrugated or crimped metal ring or tube 49 holds the end of the hose on the ferrule. Ferrule 47 has an annular groove 51 for the reception of an O-ring 52 and carries a split metal stop-ring 53 employed only in connection with the assembly of the parts. The metal ferrule is connected by crimping the metal, as illustrated at 54, to a nylon insulator 56 which carries four contact rings 57, 58, 59, and 61.

The water conduit 66 runs through the hose 14 and in loose relation thereto. The hose connects with an annular passage 67 through the ferrule 47 which connects with an enlarged cavity 68 in the handle part 12. The air conduits have not been fully shown as these passages would obscure parts of the drawings. The water tube 66 which is of flexible plastic material connects with a metal ferrule 71, as shown at 69. Metal ferrule 71 has a water passage 72 extending therethrough which connects with a water tube 73 carried by the handle or body part 12 of the syringe 11.

For the purpose of making this detachable water connection, a male plug 76 carries ferrule 71 and has a water passage 77 therein. The male plug 76 is threaded, as indicated, into the threaded end of the core 80 which is part of the nylon insulator 56. The male plug 76 has a cap 81 which has a water passage conecting with the passage 72, 77 and is threaded as indicated at 82, into the male plug 76. An O-ring 83 is pressed between the end of the cap 81 and a seat on the male plug 76. The water tube 73 fits into the passage extending through the cap and ferrule and the connection is substantially sealed by the O-ring 83.

All parts connected to the plug 76 and extending to the right thereof as shown in FIG. 2, may rotate with respect to the handle part 12 of the syringe 11. The degree of rotation is in excess of 180° so that the syringe 11 may be aligned with the hose and its connections through any angle. Thus, without change, the syringe may be used by either a right or left-handed dentist and the rotation of the parts will accommodate the position of the syringe in which it is used. The parts are rotatable 360° with respect to each other but the degree of rotation should be not less than 180°. If desired, stops may be used to limit the degree of rotation to that actually required in use of the instrument.

One of the problems in connection with any retractable hand instrument is to avoid damage to the hose and particularly to the utility conduits or wires extending through the hose when the instrument is pulled outward by the dentist against the action of the retraction mechanism for use. The dentist has his attention directed on the patient's mouth and often reaches for the instrument he desires to use by feel. He may then pull outward excessively on the hose beyond its limits and place a strain on the utility conduits and wires and may even, with a violent jerk sever the utility conduits and wires. One of the important aspects of our invention is to avoid this possibility.

For the above purposes, the ferrule 47 is provided with an annular recess 88. A pair of openings extend through the wall of the ferrule at the recess as indicated at 89. The end of a thin wire or cable 91 of fixed length is threaded through the openings 89 and its end swaged against the adjacent part of the cable, as indicated at 92. Thus, the end of the cable is fixed to the ferrule which in turn is rotatably fitted to the handle part 12 of the syringe. As shown in FIG. 1 and as shown in FIG. 2, the other end of the cable 91 is fixed to the male plug part 26 which, as previously described, is fixed with a set screw with respect to the wall of the dental unit. The inboard end of the cable 91 extends through openings in the end of the male plug part of the coupling which fastens in the same manner as the outboard end of the cable as shown at 95 in FIG. 1.

In practice, the hose, generally indicated by the numeral 14 is made of rubber and is stretchable so that it will yield in all directions which also includes longitudinally thereof. However, while the hose has longitudinal stretch, the stretching of the hose applies a back force resisting further stretching. Utility conduits including the electric wires extending through the hose are made so that there is some slack in them which will be taken up at least partly when the hose is stretched. While the cable 91 is long enough to permit some stretching of the hose, it is shorter than the utility lines with their slack. Thus, regardless of how hard the dentist pulls or "yanks" on the hose, the utility conduits cannot be pulled from the dental unit or otherwise damaged as the strain thereof is taken up on the cable.

Held in position by screws 96 extending into the insulator part 84 are four contact springs 97 which engage the contact rings 57, 58, 59, and 61. The contact rings 57, 58, 59 and 61 are mounted on and secured to the insulator 56. These contacts are connected by wires to electrical conduits which extend through the air space of the hose and to the plugs 40 (FIGS. 1 and 6). Three of the contact springs are connected by wires 98 (FIG. 4) extending through a sealed off space to microswitches 101 and 102 mounted on the conductors.

Figure 4:
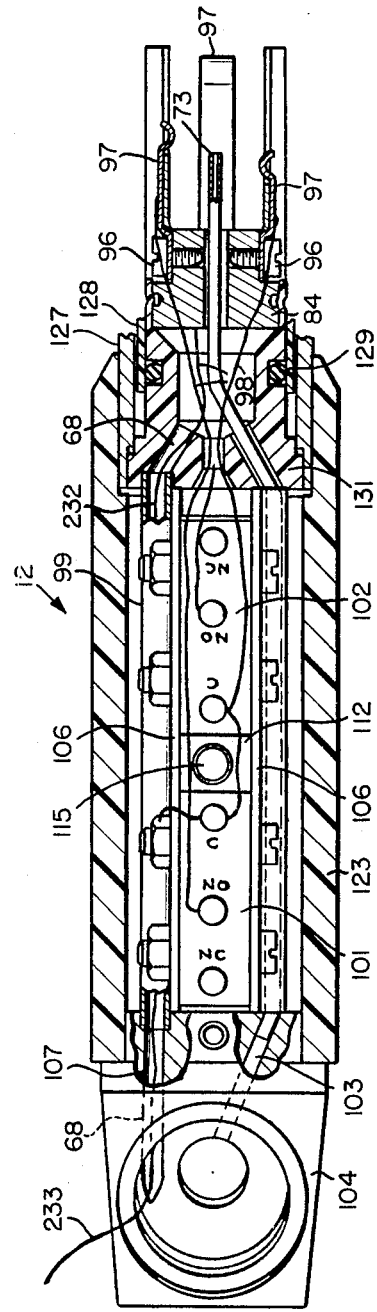
FIG. 4 is a sectional view of a part of FIGS. 2 and 3 showing the handle end of the syringe with the handle rotated ninety degrees from its position in those views and taken on the line 4—4 of those views.

The wiring is such, as illustrated in FIG. 7, that when microswitch 101 is depressed a solenoid operated water valve in the dental unit is opened which is not shown in FIG. 6 but is diagrammatically illustrated in FIG. 7 and indicated by the numeral 105. Water flows through the flexible plastic tubing 66 extending through the hose and through the passages previously described. The water, by connections through the handle which connect with the tubular member 73, extends to a passage 103 in a block 104 (FIG. 4). The water passage 103 connects with a water passage in the dispensing section 13 of the syringe as will be presently described.

When the microswitch 102 is actuated, the solenoid valve in the dental unit (not shown) but indicated diagrammatically in FIG. 7 by the numeral 100 is opened to admit air in the air passage 38 (FIG. 6) through the hose which eventually flows, as previously described, to an air flow space 68 (FIG. 4) formed in the handle. The air flows from the air flow space through a conductor 99 mounted on a switch carrier 106 as shown in FIG. 4, to a passage 107 formed in the block 104. The conductor 99 also carries the wire 232 which extends to a heater as will presently appear.

A thumb piece 108 has a recess 109 in which a screw 111 is countersunk. The screw passes through a clearance 110 and is threaded into a socket 112 carried by the switch carrier 106. A spring 113 lies in a recess 114 formed in the thumb piece 108 and normally presses the thumb piece in an upward direction as viewed in FIG. 3. An adjustable stop 115 limits the downward movement of the thumb piece and enables adjustment of the point in the downward movement of the thumb piece at which the microswitches 101 and 102 will be actuated. At 116 we have indicated means for adjusting the switches 101, 102 longitudinally along the handle on the switch carrier 106.

Referring now to FIG. 7 as well as FIG. 3, it will be clear that when the thumb piece 108 is depressed adjacent the nmeral 121, it will tilt as allowed by the clearance 110 and engage the contact button on the microswitch 101 which causes water to flow through the passages previously described to the passage 103 (left of FIG. 3) from the solenoid water valve 100. When the thumb piece is depressed by the thumb adjacent the numeral 122, the thumb piece is tilted and microswitch 102 is actuated to cause air to flow from solenoid valve 105 through the passage 107 (FIG. 4).

Referring again to FIG. 7, the circuit also includes a transformer 120, the primary coil of which is connected to a source of energy within the dental unit. The wire 125 connects over wires 232 and 233 to an electrical heater mounted in the dispensing part 13 of the syringe and also constitutes a common wire to the air and water solenoids 100 and 105 so that when the thumb piece 108 is depressed adjacent its center, both microswitches 101 and 102 are actuated to energize both the air and water solenoid valves 100 and 105 to cause water and air to flow through the passages 103 and 107 respectively. As will presently appear, such action causes a water-air mist or spray to issue from the dispensing section of the syringe.

The parts above described are housed within a casing which includes a cylindrical insulating handle member 123 attached to block 104 by screws 130 (FIG. 3). At its other end the insulating handle member 123 is secured by screws 126 to a metal sleeve 127 (FIG. 2). The metal sleeve 127, upon removal of screws 126, may be shifted to the right to expose an inspection window member 128 of plastic material. Upon removal of screws 126 the entire core assembly including the plug 76 may be removed from the syringe 11. The plastic window 128 extends in fluid tight relation to O-ring 52 and to O-ring 129 carried in an annular recess formed in a member 131. A flexible spirally wound hose protector 132 extends around the outboard end of the hose and is rigidly attached at one end to a metal sleeve 133 while the other end of the hose protector 132 is free to yield. The metal sleeve 133 telescopes over the end of the metal sleeve 127 and is secured thereto by screw 134.

Referring now to FIG. 3, the water and air disepensing part of the syringe comprises the block 104 previously described, a nose cone 141, a syringe tip 142 and a cap 143. The nose cone and block house mechanism for adjusting the volume of water and air, and means for heating the water will be presently described.

The nose cone 141 as will presently appear, is adapted to rotate with respect to the block 104 to vary the volume of air discharged from the syringe. The syringe tip 142 has a water tube 144 extending in substantially concentric relation thereto and has a stepped shoulder 146 which rests upon a complementary shoulder 147 formed on the interior of the nose cone 141. The syringe tip is free to rotate on the shoulders 146, 147 so that the syringe tip may be oriented with respect to the syringe handle so as to direct the stream of fluid as desired by the dentist. The water tube 144 extends through the nose cone 141 and through the syringe tip 142 and terminates in the cap as shown at 148 where it mixes with air when the finger piece is pressed adjacent its center so as to actuate both solenoid valves.

The water gains access to the water tube 144 through an annular groove 151, communicating with the passage 103 (FIG. 4) formed in a water directing sleeve 152. The sleeve has a radial passage 153 allowing the water to flow from the annular groove 151 to a chamber 154. The chamber 154 is in open communication with the upper end of the water tube 144.

Means are provided for regulating the volume of water fed to the water tube 144. Such means comprise a valve having a valve stem 156. The valve stem 156 carries a retaining ring 157 fixed in a groove therein which abuts against a sealing washer ring 159. The sealing washer 159 may be brought into engagement with a wall 161 formed in a nut 162. When in this position the radial passage or port 153 is open to its maximum extent.

The nut 162 is threaded, as shown at 163, extends into mating threads formed in the block 104 and abuts against a face 164 of the block 104. The nut butts against a retaining ring 158 and holds it against an abutment. The interior of the nut is threaded, as shown at 166, to receive corresponding threads on the valve stem 156. The stem is controlled by a finger piece 167 so that the stem may be threaded inward and outward to open and close the port 153 to vary the volume of flow of water. Leakage of water around the stem and the water tube 144 is prevented by a pair of O-rings 168 interposed between the parts as shown in FIG. 3.

Air flows from the passage or connection 107 (FIG. 4) to an annular air space or chamber 176 (FIG. 3) formed in the block 104. Air space 176 communicates with a pair of ports 177 which may be blocked by an air valve disc 178. The air disc 178 has a pair of elongated crescent shaped openings 180 (FIG. 5) therein which may be moved into and out of registry with the ports 177 by rotating the air disc 178.

For the purpose of rotation, the air disc 178 has a pair of depending ears or tongues 179. Tongues 179 are adapted to register with a pair of notches 181 formed on a shoulder 182 integral with the nose cone 141.

When the openings in the valve disc 178 are in registry with the ports 177, air may flow through the annular space 183 internally of the nose cone and through a pair of radial ports 184 formed in the syringe tip. The air flows through an annular passage 186 into an annular passage 187 extending around the water tube 144. For assembly purpose, the end of the tip has a piece 188 soldered at 189 to the tip proper. The cap 143 includes an air and water mixing chamber 196, the air flowing to the mixing chamber 196 through a pair of longitudinally extending slots 197 formed in the cap 143.

As previously mentioned, means are provided for regulating the volume of air flow and this is accomplished by rotating nose cone 141 to rotate the air valve disc 178. Rotation of the nose cone is accomplished by rotating a finger piece assembly, generally indicated by the numeral 199, as will presently appear. The nose cone carries the means for maintaining the water in the water lines at a predetermined desired temperature.

The nose cone assembly comprises an insulator 200 which is urged into engagement with the lower O-ring 168 by means of a spring 201. One end of the spring 201 engages the lower end of the insulator, extends in concentric relation with the water conduit 144 and has its other end seated on a shoulder formed on an enlargement 202 provided on the water coduit 144. An insulating cup-shaped member 203 has a central opening through which the water conduit 144 extends.

A metal conducting cup 206 has an opening in its lower end through which the water conduit 144 passes, as shown at 207, and has an outwardly extending flange 208 at its upper end. A cylindrical insulator 211 has flanges at its upper and lower ends, the lower one of which serves as a seat for a spring 212. The spring 212 urges the air valve washer or disc 178 into engagement with its seat. A nut 216 having a knurled perimeter, as shown at 217, is threaded into the block 104 as shown at 218.

A ring 219 extends in concentric relation with the nose cone 141 and has a threaded opening 221 in its perimeter into which the finger pieces, generally indicated by the numeral 199, is threaded. The finger piece 199 comprises a conically shaped pressure end 223 in the end of a threaded pin 220 adapted to be moved into the threaded opening 221 and into engagement with the adjacent wall of the nose cone so that upon rotation of the finger piece 199 the nose cone will rotate with it. The threaded pin 220 has a sleeve 224 freely rotatable thereon. The pin 220 has a cap 226 with a screw-driver slot 227. Upon tightening the threaded pin 220 by means of a screwdriver, the ring is fixed with respect to the nose cone but there is sufficient clearance to enable the sleeve 224 to rotate freely as the ring is rotated by finger operation to rotate the nose cone 141.

As previously mentioned, the upper end of the nose cone 141 has the indentations or notches 181 to register with the down-turned tongues 179 on the air regulating disc 178. When the finger piece, generally indicated by the numeral 199 is rotated, the openings 180 in the air regulating disc 178 are brought more or less into or out of registry with the ports 177. By varying the position of the openings 180 in the disc with respect to the ports 177, the volume of air discharge through the syringe tip may be varied.

It will be apparent from the above description that either the volume of air or water discharged through the syringe tip may be varied. Moreover, it will be apparent that both air and water, air alone, or water alone, may be discharged through the tip. Thus, it is possible to discharge air alone in large volume for the purpose of blowing chips away from the area being operated upon or it is possible to provide a gentle flow of air for drying a tooth in preparation for filling a cavity. It is further possible to discharge a spray of air and water on the tooth being operated upon by cutting down on the volume of water by rotation of the thumb or finger piece 167 and using a relatively large volume of air.

One of the important aspects of our invention is that the water and air may be regulated while the dentist retains his normal grasp on the barrel of the syringe or the section 11. Moreover, the air and/or water may be regulated while the dentist is depressing the thumb piece 108 into any one of its three positions as described above. For example, with the dentist having his thumb on the thumb piece 108 adjacent the end 121 so as to dispense water from the fluid dispensing end of the handpiece, the finger piece 167 is within easy reach of the dentist by shifting his fore-finger into contact therewith so as to dispense water from the fluid dispensing end of the handpiece. The finger piece 167 is within easy reach of the dentist by shifting his forefinger into contact therewith so as to rotate the finger piece 167 and adjust the supply of water.

Likewise, when the thumb piece 108 is depressed by the thumb adjacent its center so as to supply both water and air through the air and water connections previously described to dispense a mist, the dentist by reaching with his forefinger may rotate the finger piece 199 or the finger piece 167 or both successively so as to vary either the supply of air or water or both. Thus, all the operations of the syringe may be controlled while the dentist retains his normal hand positioning on the syringe and while he is directing the stream of water, air or spray into the patient's mouth.

The application of cool water to a sensitive tooth undergoing treatment is usually accompanied by pain; therefore, as previously mentioned, the syringe is provided with an electrical resistance heater. In dental practice, the syringe is normally supplied with warm water from a source of warm water within the dental unit. However, after periods of non-use of the syringe, the water in the lines from the dental unit to the dispensing chamber drops to room temperature. In the syringe of this invention, when the dental unit is turned on in the morning when the dentist or his assistant comes to the office, an electrical resistance heater is automatically turned on to raise the temperature of the water in the lines. By the time the dentist is ready to work on his first patient the water in the lines is warm. Thus, after a period of non-use of the syringe, the dentist may pull the syringe from the dental unit, in the manner previously described, and immediately start dispensing warm water upon the area to be operated upon.

For the above purposes and referring now to FIG. 7, the circuit from the transformer includes the line 125 which has a resistor 231 therein by which the current flow and hence the temperature of the water in the dispensing lines may be regulated. This line leads from the conductors, previously described, through a line 232 which is connected as shown at 233 (see also FIGS. 2 and 3) to a conducting washer 234 making contact at 236. The conducting washer contacts a metal conducting cup 206

(see also FIG. 5) which engages an inverted conducting cup 238.

The heater comprises a hollow cylindrical insulating body 241 having a resistance wire 242 wound around it and the cup 238 carries the current to the wires. A spring 244 seated on the inside shoulder 146 formed internally of the nose cone 141 is wound around the other end of the cylindrical body 241 and presses on the ceramic insulator and urges the cups 238 and 206 into electrical contact. The current is lead off of the wire through the spring 244 onto the shoulder 146, through nose cone 141 over the nut 216 to the block 104 which has ground potential.

It will be apparent from the foregoing that we provide a novel syringe assembly which has a number of features of novelty of considerable importance to the dentist in performing his operations. While we have shown and described the preferred form of mechanism of our invention, it will be apparent that various modifications and changes may be made therein particularly in the form and relation of parts, without departing from the spirit of our invention as set forth in the appended claims.

I claim:
1. A syringe assembly for use in dental operations adapted to be carried by and within a dental unit comprising the combination of:
   (a) a syringe body having fluid passages and adapted to be shifted from an inoperative position to an operative position for utilization of the fluid;
   (b) switch means carried by the syringe body, said switch means including a single actuating member for actuating either of two switches or both switches simultaneously;
   (c) fluid valve means in the dental unit;
   (d) means in the dental unit opening and closing said fluid valve means upon actuation of said switch means; and
   (e) manually operated means on the syringe body for actuating said switch means to discharge fluid from said syringe.

2. A syringe assembly for use in dental operations adapted to be carried by and within a dental unit comprising the combination of:
   (a) a syringe having air and water passages and adapted to be shifted from an inoperative position to an operative position for utilization of air, water, or a spray of air and water in the mouth of the patient;
   (b) switch means carried by the syringe body;
   (c) air and water valves in the dental unit;
   (d) means in the dental unit for selectively opening and closing said air and water valves upon actuation of said switch means;
   (e) manually operated means on the syringe for selectively actuating said switch means to discharge from said syringe water, air or a mixture of water and air; and
   (f) means for varying the volume of air and water discharged independently of each other.

3. A syringe assembly for use in dental operations adapted to be carried by and within a dental unit comprising the combination of:
   (a) a syringe body adapted to be grasped in the hand of a user;
   (b) a syringe discharge section carried by and operatively connected to said syringe body;
   (c) means for supplying air and water from said dental unit through said syringe body to the syringe discharge section;
   (d) means including a switch actuator adapted to be actuated by the thumb while the syringe body is grasped to supply water, air or a mixture of water and air to the syringe discharge section; and
   (e) means including elements for varying the volume of air and water discharged through the discharge section independently of each other; said elements being located so that at least one of them may be finger adjusted by the user while the syringe body is grasped.

4. A syringe assembly in accordance with claim 3 in which said elements are carried by the syringe discharge section adjacent said syringe body.

5. A syringe assembly in accordance with claim 3 in which a spring is provided to restore said switch actuator to a non-switch engaging position and at least one of said elements is carried by the syringe discharge section in a position such that it may be finger adjusted while the thumb depresses the switch actuator or is depressed against the action of said spring.

References Cited

UNITED STATES PATENTS

| 2,104,670 | 1/1938 | Pieper | 128—401 |
| 3,001,288 | 9/1961 | Freedman | 32—69 |
| 3,039,521 | 6/1962 | Hamman | 239—413 |
| 3,058,668 | 10/1962 | Harmes et al. | 239—305 |
| 3,093,311 | 6/1963 | Morris et al. | 239—414 |
| 3,137,297 | 6/1964 | Maurer et al. | 128—173.1 |
| 3,163,707 | 12/1964 | Darling | 128—142 |
| 3,180,585 | 4/1965 | Pusey et al. | 32—22 |
| 3,254,646 | 6/1966 | Staunt et al. | 128—173.1 |

OTHER REFERENCES

Ritter Units, Ritter Dental Manufacturing Co., Inc., Rochester, N.Y. Am559–5M–540 (p. 9 relied on).

RICHARD A. GAUDET, *Primary Examiner.*

K. L. HOWELL, *Assistant Examiner.*